(12) United States Patent  
Childers et al.

(10) Patent No.: US 8,870,468 B2  
(45) Date of Patent: Oct. 28, 2014

(54) MULTI-PORT SHIELDED ADAPTER

(75) Inventors: Darrell R. Childers, Hickory, NC (US); Hiep Nguyen, Fort Mill, SC (US)

(73) Assignee: US Conec, Ltd, Hickory, NC (US)

( * ) Notice: Subject to any disclaimer, the term of this patent is extended or adjusted under 35 U.S.C. 154(b) by 0 days.

(21) Appl. No.: 12/710,309

(22) Filed: Feb. 22, 2010

(65) Prior Publication Data

US 2011/0206324 A1 Aug. 25, 2011

(51) Int. Cl.  
*G02B 6/38* (2006.01)  
*G02B 6/00* (2006.01)  
*G02B 6/42* (2006.01)

(52) U.S. Cl.  
CPC ............ *G02B 6/3825* (2013.01); *G02B 6/4277* (2013.01); *G02B 6/3897* (2013.01)  
USPC ................................ 385/71; 385/55; 385/134

(58) Field of Classification Search  
USPC .............................................. 385/55, 71, 134  
See application file for complete search history.

(56) References Cited

U.S. PATENT DOCUMENTS

| 6,513,990 B2 * | 2/2003 | Kuhne ............................ 385/70 |
| 2006/0140551 A1 * | 6/2006 | Yu et al. .......................... 385/92 |
| 2009/0290838 A1 * | 11/2009 | Lin et al. ......................... 385/55 |

\* cited by examiner

*Primary Examiner* — Jerry Blevins  
(74) *Attorney, Agent, or Firm* — Michael L. Leetzow, P.A.

(57) ABSTRACT

An inner sleeve has a main body with an opening therein and a front and back end. The back end has projections or extensions to engage corresponding cavities on another inner sleeve to allow for movement of the inner sleeves relative to a outer portion into which the inner sleeves have been inserted. The outer portion may accommodate any number of inner sleeve pairs.

17 Claims, 10 Drawing Sheets

MULTI-PORT SHIELDED ADAPTER

BACKGROUND OF THE INVENTION

1. Field of the Invention

A multi-port EMI shielded adapter provides small alignment errors in a large adapter array while still providing high EMI performance. The multi-port EMI shielded adapter includes individual adapter inner sleeves to allow for accurate alignment of connectors, particularly in large arrays of fiber optic connectors.

2. Summary of the Invention

The present invention is directed to a fiber optic adapter array that includes an outer first portion having a plurality of openings therein, an outer second portion, the outer second portion having a plurality of openings and attachable to the first outer portion, the plurality of openings in first and second portions aligning when the first and second portions are attached to one another, and a plurality of inner sleeves, the plurality of inner sleeves each having a front end and back end and an opening extending therebetween to receive a fiber optic connector, the back end having at least one extension and at least one cavity, the extension and cavity positioned to correspond with a cavity and extension of a corresponding inner sleeve.

In some embodiments, the fiber optic adapter array includes a shield disposed between the first and second outer portions, the shield having a plurality of first openings corresponding to the plurality of openings in the first and second outer portions and a plurality of second openings corresponding to the extensions on the plurality of inner sleeves.

In some embodiments, each of the plurality of inner sleeves is aligned to another of the plurality of the inner sleeves with the keyways aligned to one another.

In some embodiments, each of the plurality of inner sleeves is aligned to another of the plurality of the inner sleeves with the keyways aligned to opposite one another.

In some embodiments, the shield elastically engages at least two outside portions of at least one of the first and the second outer portions.

In another aspect, the invention is directed to an inner sleeve for an adapter housing that includes a main body having a front end, a back end, and an opening extending therebetween configured to receive a fiber optic connector, at least one extension extending from the back end and away from the main body, and at least one cavity in the back end of the main housing to receive an extension from another inner sleeve.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
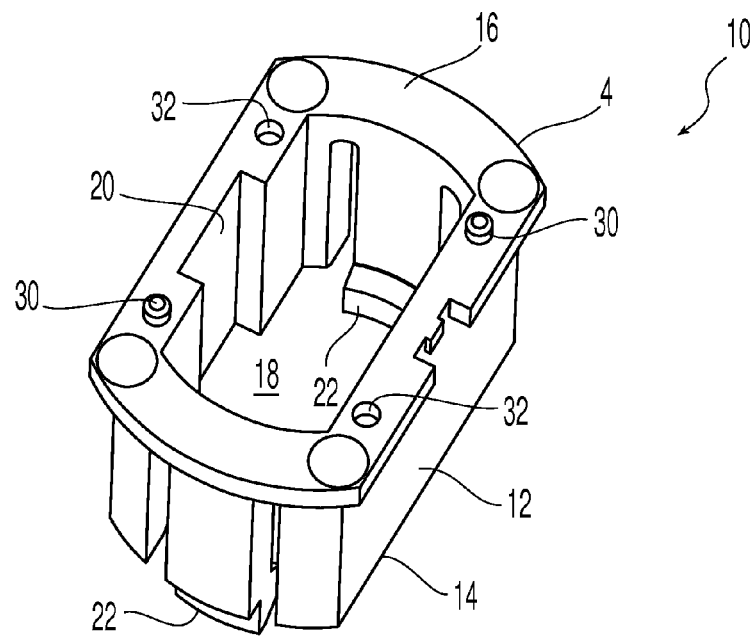
FIG. 1 is a perspective view of one embodiment of an inner sleeve for an adapter housing according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
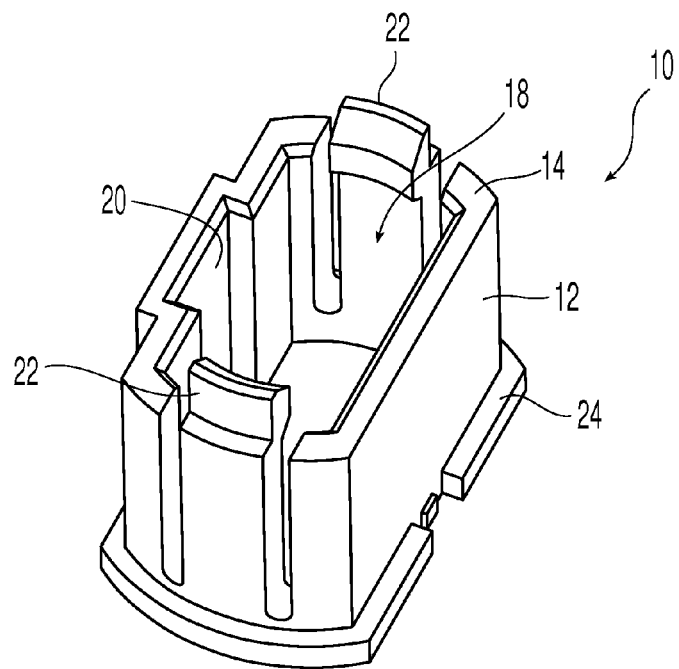
FIG. 2 is a perspective view from the front of the inner sleeve of FIG. 1.

Referring to FIGS. 1 and 2, an inner sleeve 10 is illustrated having a main body 12 that extends between a front end 14 and a back end 16. The main body 12 has an opening 18 that extends between the front end 14 and the back end 16 and is configured to receive a fiber optic connector (not shown). The opening 18 has a keyway 20 in one side to engage a corresponding key on the fiber optic connector to ensure that the fiber optic connector is correctly inserted into the inner sleeve 10. The main body 12 also has cantilevered latches 22 to engage the sides of the fiber optic connectors to retain the fiber optic connectors in the inner sleeve 10.

The back end 16 of the main body 12 preferably has a flange 24 that extends around at least a portion of the back end 16. As described in more detail below, the flange 24 engages a portion of an outer house to prevent the inner housing from being removed through the front of the adapter array.

The back end 16 of the main body 12 also has at least one extension 30 and at least one cavity 32. As illustrated in FIG. 1, the inner sleeve 10 has two extensions 30 and two cavities 32. It should be noted that the two extensions 30 and two cavities 32 are on opposite sides of the opening 18. Similarly, the extensions 30 and cavities 32 are not directly across the opening 18 from one another, but each of the extensions 30 are opposite one of the cavities 32. The inner sleeve 10 mates with another identical inner sleeve 10 by aligning the extensions 30 and cavities 32 on one of the inner sleeves 10 with the cavities 32 and extensions 30 of the other inner sleeves 10. Preferably, the openings 18 of the inner sleeves 10 are preferably aligned with one another within about 0.025 mm by the extensions 30 and cavities 32. As noted below in more detail, an electromagnetic interference (EMI) shield may be disposed between the two inner sleeves 10.

The configuration of the extensions 30 and the cavities 32 allows for the inner sleeve 10 to accurately align with another inner sleeve 10, as noted above, in one of two configurations.

First, two inner sleeves could be attached to one another (to allow for two fiber optic connectors to mate) such that the keyways 20 are in alignment—so that the fiber optic connectors mate with one another in a key-up to key-up configuration. Second, the two inner sleeves 10 could be attached to one another in a key-up to key-down configuration if so needed. It should be noted that the extensions 30, while illustrated as cylindrical projections from the back end 16, could be of any appropriate shape or size, as long as they can accurately align two inner sleeves 10 relative to one another. Similarly, the cavities 32, which correspond to the configuration of the extensions 30, may also have another configuration as long as they accurately mate with the corresponding extension 30.

Figure 3:
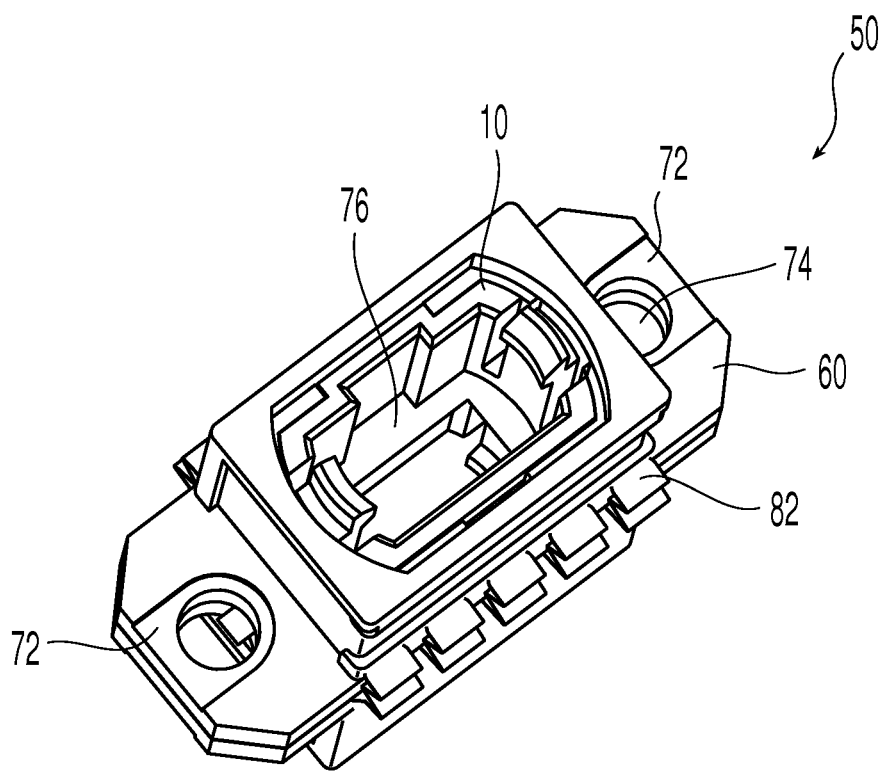
FIG. 3 is a perspective view of an assembly of two inner sleeves as in FIG. 1 in a single adapter housing.
Figure 4:
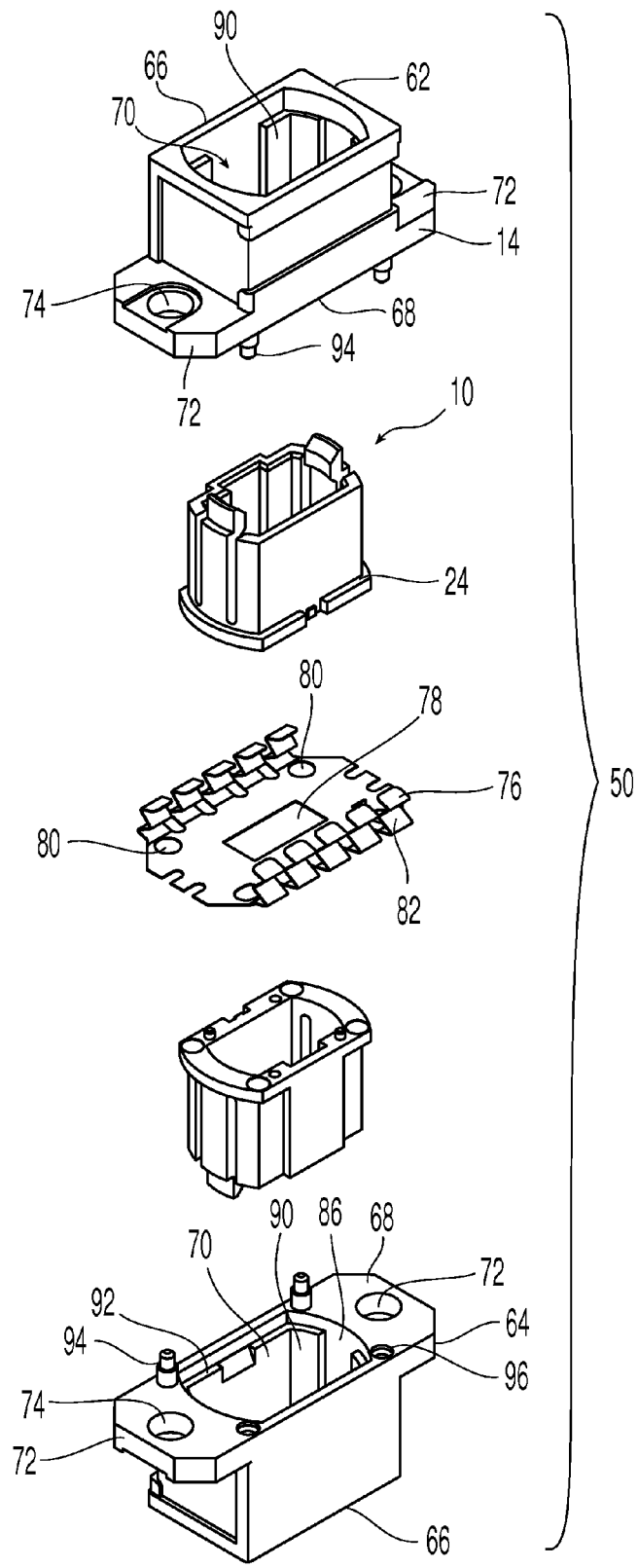
FIG. 4 is an exploded view of the assembly of FIG. 3.

Turning to FIGS. 3 and 4, an assembly 50 is illustrated using two of the inner sleeves 10 and an outer adapter 60. The outer adapter 60 has two outer adapter portions 62,64 that are similar to one another. The outer adapter portions 62,64 each have a front side 66, a back side 68 and an opening 70 extending therebetween and into which the inner sleeves are inserted from the back side 68. The outer adapter 60 has two extensions 72 that have openings 74 therein to allow the adapter to be secured to a panel.

Positioned between the two outer adapter portions 62,64 is an EMI shield 76. The shield 76 has openings corresponding to the openings in the inner sleeves 10 and also to the extensions 30 and the cavities 32. For example, the shield 76 has an opening 78 that corresponds to the opening 18 and openings 80 that correspond to the extensions 30 and the cavities 32. These openings 78, 80, are larger (by about 0.3 mm) than the extensions 30 to allow movement of the inner sleeves 10 relative to the outer adapter 60. The elastic members 82 elastically engage an outer surface 84 of the outer adapter 60 to provide EMI protection. The movement of the inner sleeves 10 is in the x-y direction (not along the length of the openings 18).

As can be seen in FIG. 4, inner side walls 86 of the outer adapter 60 have extensions 90 that protrude into the opening 70. The extensions 90 have an upper surface 92 that can engage and support the flange 24 of the inner sleeve 10. The engagement of the upper surface 92 and the flange 24 of the inner sleeve 10 prevents the inner sleeve 10 from being removed from the outer adapter 60 through the front side 66. The distance from the upper surface 92 to the back side 68 of the outer adapter 60 allows for some movement by the inner sleeve 10 relative to the outer adapter 60.

The two outer adapter portions 62,64 each have two adapter extensions 94 and adapter cavities 96 on the back side 68. While both adapter extensions 94 and adapter cavities 96 are on the same side of the outer adapter portions 62,64 as illustrated, there may be one of each on each side the outer adapter portions 62,64 and fall within the scope of the present invention. While generally cylindrical extensions 94 and correspondingly configured cavities 96 are illustrated, the adapter extensions 94 and adapter cavities 96 can be of any appropriate configuration and length/depth to align the outer adapter portions 62,64 to one another.

Figure 5:
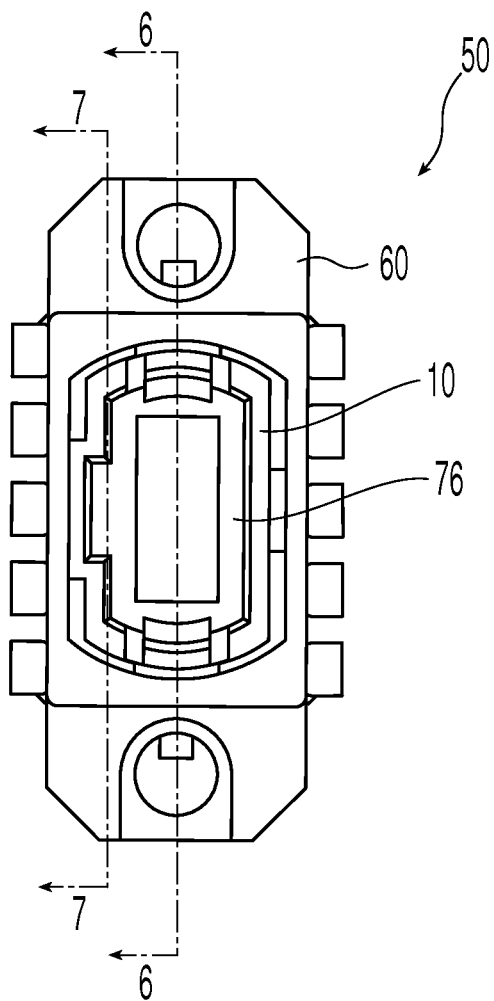
FIG. 5 is a top view of the assembly of FIG. 3.
Figure 6:
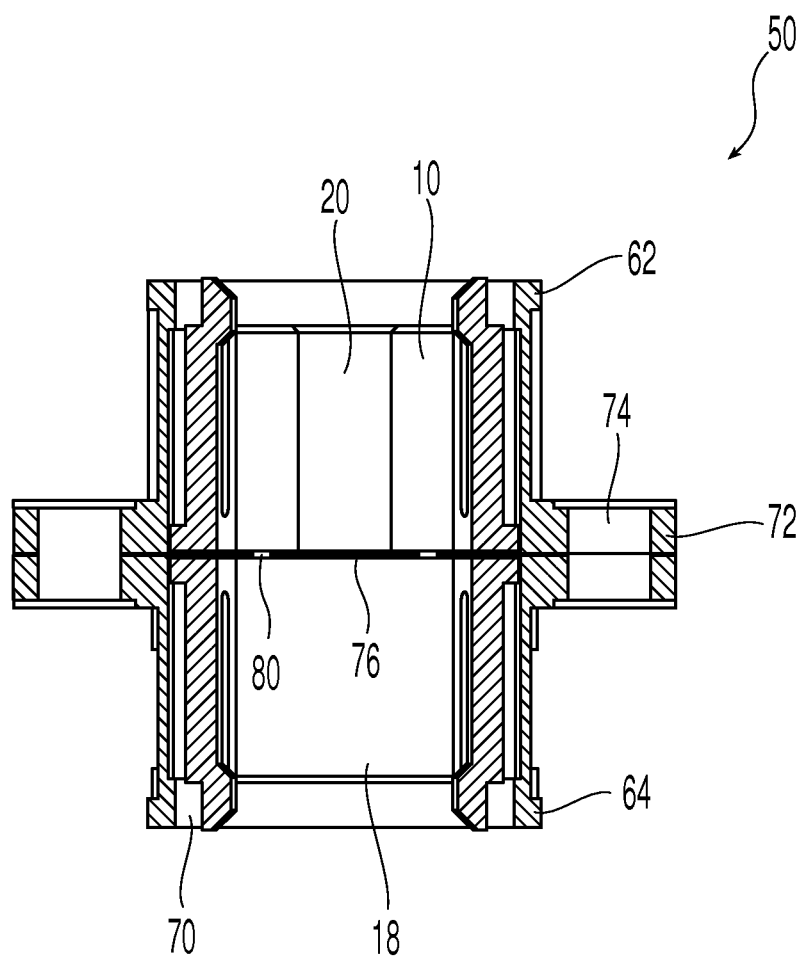
FIG. 6 is a cross section view of the assembly along the line 6-6 in FIG. 5.
Figure 7:
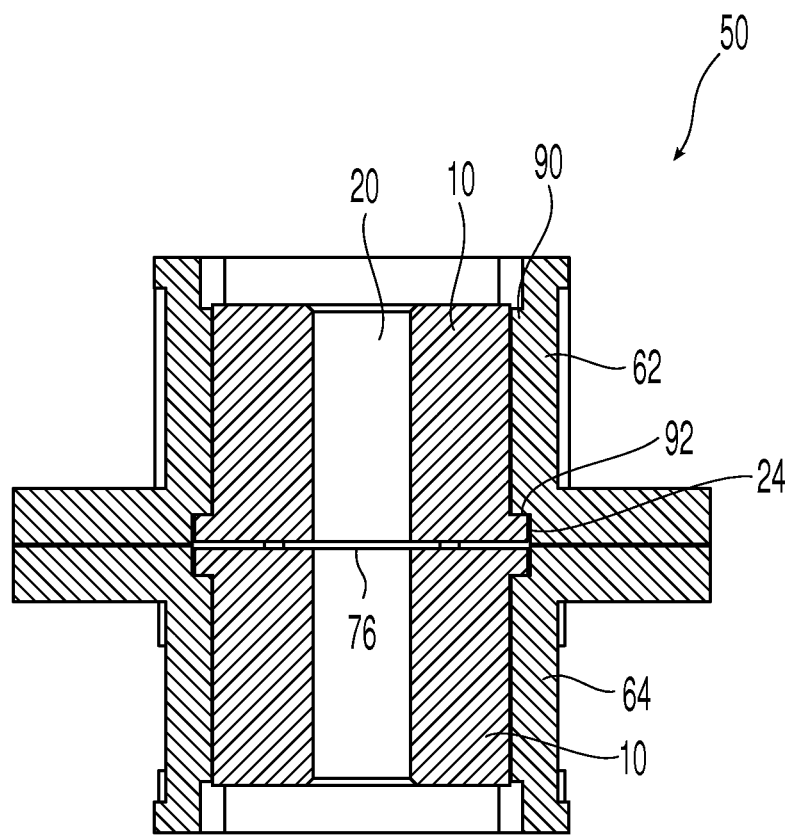
FIG. 7 is a cross section view of the assembly along the line 7-7 in FIG. 5.

A top view of the assembly 50 is illustrated in FIG. 5. From this view one can see the openings in the outer adapter 60 and its two outer adapter portions 62,64, the opening in the inner sleeve 10 and even the opening in the shield 76. FIG. 6 is a cross-section along the line 6-6 in FIG. 5. In this figure, the configuration is a key-up to key-down as the keyway 20 can be seen in the top inner sleeve 10. FIG. 7 illustrates the relative placement of the inner sleeves 10 to the extensions 90 on the inner side walls 86 of the outer adapter 60. It should be noted that while the inner sleeves 10 and the extensions 90 appear to be in contact with one another, there is a space of at least 200 microns to allow float for the inner sleeves relative to the outer adapter 60. The two inner sleeves 10 are connected to one another (through the shield 76) and when force is applied to connectors (not shown), the two connected inner sleeves 10 can move (left and right and in and out of the page as illustrated in FIG. 7). There is less movement in the z direction, but there must be some freedom in that direction to allow the inner sleeves 10 to move in the x-y plane. Preferably, there is sufficient room between the upper surface 92 and the back side 68 of outer adapter 60 to allow movement of the inner sleeves of about 0.1 mm in the z-direction.

Figure 8:
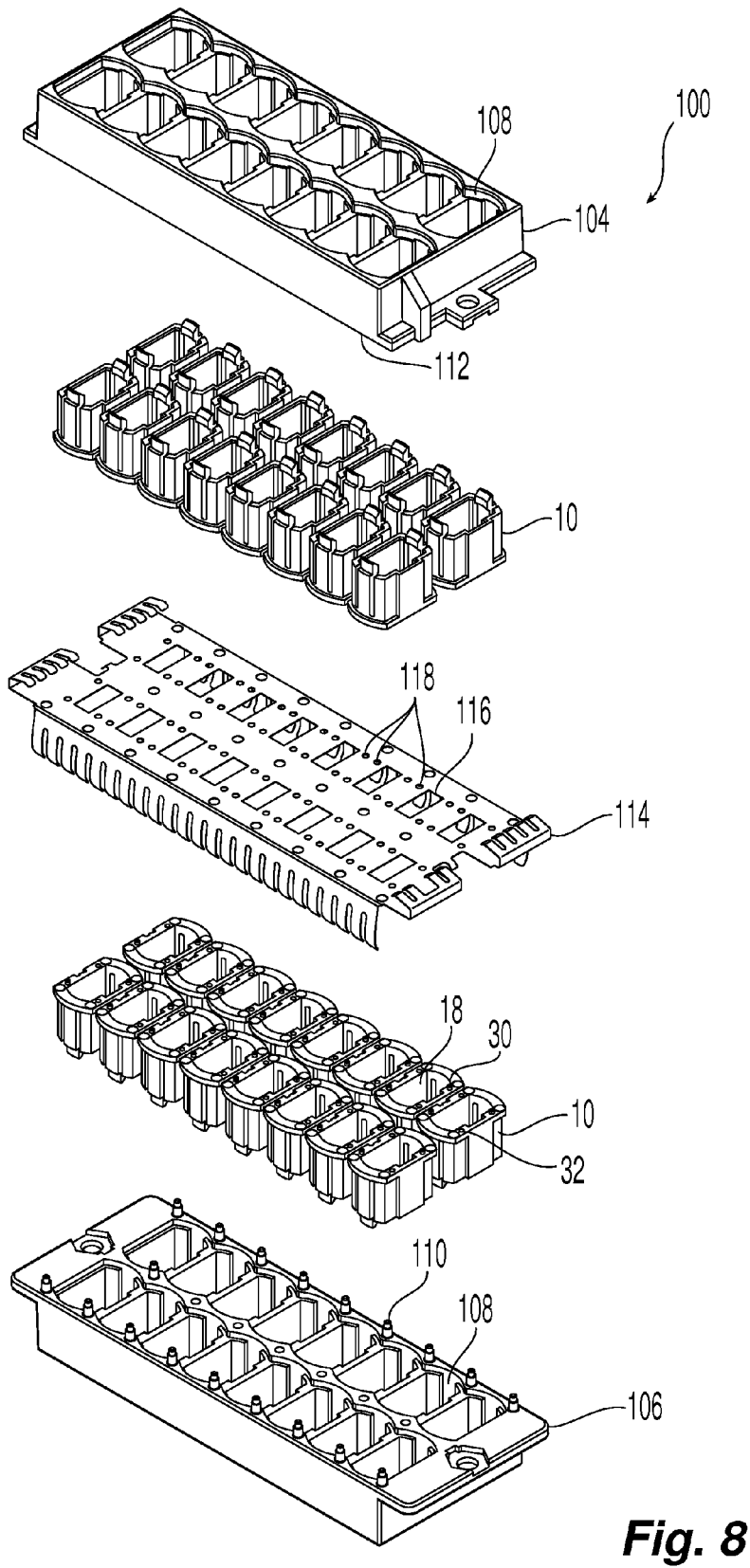
FIG. 8 is an exploded, perspective view of one embodiment of an assembly of a inner sleeves and adapter housings according to the present invention.
Figure 9:
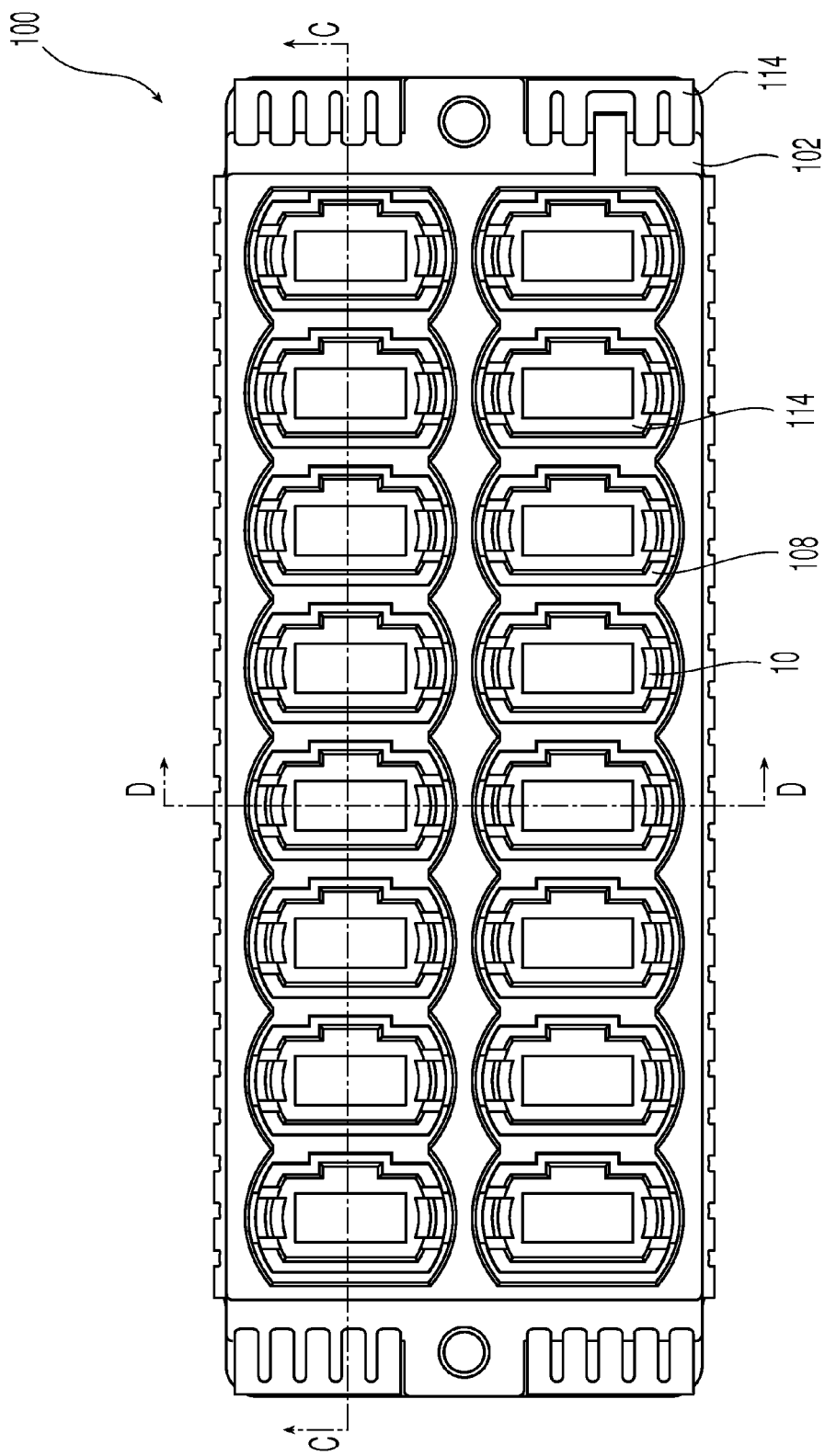
FIG. 9 is a top view of the inner assembly of FIG. 8.
Figure 10:
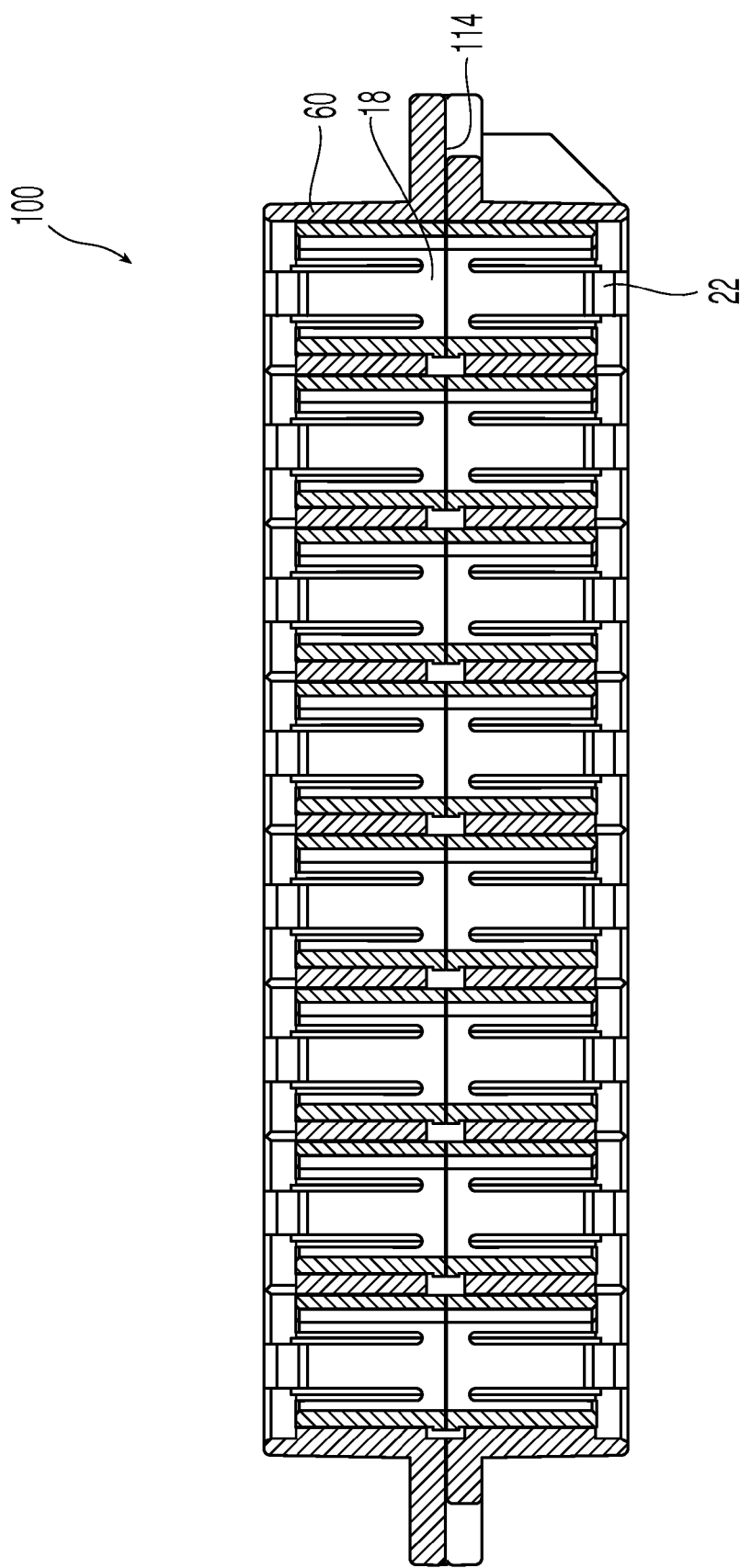
FIG. 10 is a cross section view of the assembly along the line C-C in FIG. 9.

An exploded view of a fiber optic adapter array 100 is illustrated in FIG. 8. The fiber optic adapter array 100 has an outer portion 102, which in turn includes an outer first portion 104 and an outer second portion 106. The outer portions 104,106 are very similar but are not identical as illustrated. Each have a plurality of openings 108 and are the same as the opening 70 as described above. While sixteen openings 108 are illustrated in FIGS. 8-10, any number of openings 108 may be included in fiber optic adapter array 100. One of the outer portions 104,106 has projections 110 that align with openings or cavities 112 in the other of the outer portions 104,106, to align the outer portions 104,106 to one another. As known to one of ordinary skill in the art, the projections 110 and openings 112 may be on either of the outer portions 104,106 or a mixture of projections 110 and openings 112 may be on both. The outer portions 104,106 may be ultrasonically welded together, glued together, riveted, or by any other means and still come within the scope of the present invention.

A plurality of inner sleeves 10 are inserted into the openings 108 in both of the outer portions 104,106 as discussed above, with a shield 114 preferably inserted between the two portions 104,106. However, the shield 114 is not necessary for each application and can be eliminated if not needed. The shield 114 has openings corresponding to the openings in the inner sleeves 10 and also to the extensions 30 and the cavities 32. For example, the shield 114 has an opening 116 that corresponds to the opening 18 and openings 118 that correspond to the extensions 30 and the cavities 32. These openings 116, 118, in conjunction with the openings in the elastic members 120 on the shield 114, allow movement of the inner sleeves 10 (and the fiber-optic connectors inserted there in) relative to the outer adapter 60 in a fashion similar to that of assembly 50 noted above.

Figure 11:
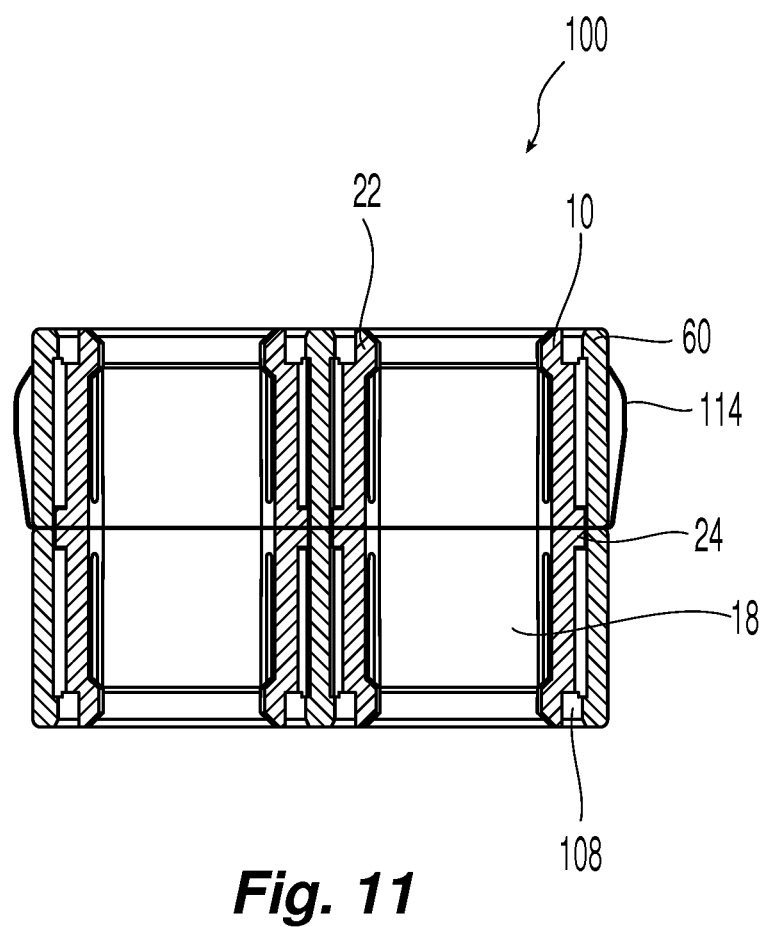
FIG. 11 is a cross section view of the assembly along the line D-D in FIG. 9.

A top view of the adapter array 100 assembled is illustrated in FIG. 9. FIGS. 10 and 11 illustrate a cross section of adapter array 100 along the lines C-C and D-D, respectively. Again, there is spacing between the inner sleeves 10 and the outer portion 102 to allow the inner sleeves 10 to move relative to the outer portion 102.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:
1. A fiber optic adapter array comprising:
an outer first portion having a front side, a back side, and at least four openings therein;
an outer second portion, the outer second portion having a front side, a back side, and at least four openings and attachable to the first outer portion with the back sides facing one another, the at least four openings in first and second portions aligning when the first and second portions are attached to one another; and a plurality of inner sleeves, the plurality of inner sleeves each having a front end and back end and an opening extending therebetween to receive a fiber optic connector, the back end having at least one extension extending away from the front end and at least one cavity extending toward the front end, the extension and cavity positioned to correspond with a respective cavity and extension of a corresponding inner sleeve.

2. The fiber optic adapter array according to claim 1, further comprising a shield disposed between the first and second outer portions, the shield having at least four first openings corresponding to the at least four openings in the first and second outer portions and a plurality of second openings corresponding to the extensions on the plurality of inner sleeves.

3. The fiber optic adapter array according to claim 1, wherein the plurality of inner sleeves are movable relative to the first and second outer portions.

4. The fiber optic adapter array according to claim 1, wherein each of the plurality of inner sleeves has a keyway disposed on an inner surface of the opening therein.

5. The fiber optic adapter array according to claim 4, wherein each of the plurality of inner sleeves is aligned to another of the plurality of the inner sleeves with the keyways aligned to one another.

6. The fiber optic adapter array according to claim 4, wherein each of the plurality of inner sleeves is aligned to another of the plurality of the inner sleeves with the keyways aligned to opposite one another.

7. The fiber optic adapter array according to claim 2, wherein the shield extends beyond at least two sides of the outer portions.

8. The fiber optic adapter array according to claim 2, wherein the shield elastically engages at least two outside portions of at least one of the first and the second outer portions.

9. The fiber optic adapter array according to claim 1, wherein the plurality of inner sleeves does not engage the openings in the outer portions.

10. An inner sleeve for an adapter housing comprising:
a main body having a front end, a back end, and an opening extending therebetween configured to receive a fiber optic connector through the front end;
at least one extension extending from the back end and away from the main body and away from the front end; and
at least one cavity in the back end of the main body to receive an extension from another inner sleeve.

11. The inner sleeve according to claim 10, further comprising a keyway in one side of the opening in the main body to receive a corresponding key from the fiber optic connector.

12. The inner sleeve according to claim 10, further comprising a flange around at least a portion of the main body adjacent the back end.

13. The inner sleeve according to claim 10, wherein the at least one extension comprises two extensions, the two extensions being disposed on opposite sides of the opening and wherein the at least one cavity comprises two cavities, the two cavities disposed on opposite sides of the opening.

14. The inner sleeve according to claim 10, the sleeve being disposed in a fiber optic adapter array, the fiber optic array having at least one opening therein to receive the inner sleeve.

15. The inner sleeve according to claim 14, wherein the fiber optic adapter array has at least four openings therein.

16. A fiber optic adapter array comprising:
an outer first portion having a front side and a rear side, and a plurality of openings therein;
an outer second portion, the outer second portion having a front side and a rear side, and a plurality of openings and attachable to the first outer portion, the plurality of openings in first and second portions aligning when the rear sides of the first and second portions are attached to one another; and
a plurality of inner sleeves to be inserted into the plurality of openings in the first and second portions, the plurality of inner sleeves each having a front end and back end and an opening extending therebetween to receive a fiber optic connector, the back end having at least one extension and at least one cavity, the extension and cavity positioned to correspond with a cavity and extension of a corresponding inner sleeve.

17. A fiber optic adapter array comprising:
an outer first portion having a plurality of openings therein;
an outer second portion, the outer second portion having a plurality of openings and attachable to the first outer portion, the plurality of openings in first and second portions aligning when the first and second portions are attached to one another;
a plurality of inner sleeves, the plurality of inner sleeves each having a front end and back end and an opening extending therebetween to receive a fiber optic connector, the back end having at least one extension and at least one cavity, the extension and cavity positioned to correspond with a cavity and extension of a corresponding inner sleeve; and
a shield disposed between the first and second outer portions, the shield having a plurality of first openings corresponding to the plurality of openings in the first and second outer portions and a plurality of second openings corresponding to the extensions on the plurality of inner sleeves.

* * * * *